United States Patent [19]
Brief

[11] Patent Number: 5,440,557
[45] Date of Patent: Aug. 8, 1995

[54] APPARATUS AND METHODS FOR PROVIDING AN INTERFACE BETWEEN FDDI-II RINGS

[75] Inventor: David C. Brief, Palo Alto, Calif.

[73] Assignee: National Semiconductor Corporation, Santa Clara, Calif.

[21] Appl. No.: 178,372

[22] Filed: Dec. 21, 1993

[51] Int. Cl.⁶ .................. H04L 7/08; H04L 12/66; H04J 14/02
[52] U.S. Cl. .................. 370/85.14; 370/108; 359/119; 375/371
[58] Field of Search .................. 371/1; 370/84, 85.12, 370/85.14, 85.15, 100.1, 108, 103; 375/106, 118; 359/119, 124; 348/512, 518; 328/155

[56] References Cited

U.S. PATENT DOCUMENTS

| | | | |
|---|---|---|---|
| 4,677,618 | 6/1987 | Haas et al. | 371/1 |
| 4,993,026 | 2/1991 | Yamashita | 370/108 |
| 5,008,904 | 4/1991 | Mangelsdorf et al. | 370/85.13 |
| 5,031,174 | 7/1991 | Natsume | 370/85.14 |
| 5,245,667 | 9/1993 | Lew | 375/106 |
| 5,297,145 | 3/1994 | Havermans | 375/106 |

OTHER PUBLICATIONS

A book entitled: *FDDI Hybrid Ring Control (HRC), Working Draft Proposed American National Standard,* American National Standards Institute ("ANSI"), May 28, 1992.

A book entitled: *FDDI Physical Layer Protocol (PHY-2), Draft Proposed American National Standard,* ANSI, Jun. 17, 1992.

A book entitled: *FDDI Station Management-2 Isochronous Services (SMI-2-IS), Working Draft Proposed American National Standard,* ANSI, May 12, 1993.

U.S. Patent application Ser. No. 08/146,337, filed Nov. 1, 1993.

U.S. Patent application Ser. No. 07/969,910, filed Nov. 2, 1992.

*Primary Examiner*—Benedict V. Safourek
*Attorney, Agent, or Firm*—H. Donald Nelson; Michael Shenker; Richard J. Roddy

[57] ABSTRACT

To exchange data in the same position in the hybrid ring control cycles in two FDDI-II rings, the cycles of the different rings are phase and frequency aligned. To achieve phase alignment, a hybrid multiplexer in one of the rings monitors the cycles on the other ring and starts a cycle when the hybrid multiplexer detects a starting delimiter on the other ring. In order to achieve frequency alignment, 8 KHz references produced by two hybrid multiplexers on the two respective rings are provided to a circuit that selects one of the references to determine the frequency for synchronizing cycle outputs of both hybrid multiplexers.

27 Claims, 23 Drawing Sheets

```
; HMUX Configuration Switch

; Inputs
   ; P_WI [11:0]
   ; P_EI [11:0]
   ; HM_OUT[11:0]

; Outputs
   ; S_WO[11:0]
   ; P_EO[11:0]
   ; HM_IN[8:0] = Code bit and 8 data bits
   ; HM_IN_TAGS[1:0]
   ; HM_IN_USYM_PAR = upper symbol parity
   ; HM_IN_LSYM_PAR = lower symbol parity
   ; HM_IN_PVALID = parity valid
   ; HM_IN_PARITY = HM_IN[9] = parity bit ; Input Interface
   ; Input bytes consist of 12 bits:
      ; in[11:10] - tag bits
      ; in[9] - odd parity over in[9:0]
      ; in[8] - control bit
      ; in[7:0] - data byte

.CLOCK CHIP_LBC

1: ; Sample inputs
      ; West port input pins
      wireg[11:0] <- P_WI[11:0],
      ; East port input pins
      eireg[11:0] <- P_EI[11:0]

1: ; Check input parity and generate symbol parity
      ; W port parity
      wind[14] = ((wireg[7] ! wireg[6]) ! (wireg[5] !
         wireg[4])),
      wind[13] = ((wireg[3] ! wireg[2]) ! (wireg[1] !
         wireg[0])),
      wparity = = ((wireg[9] ! wireg[8]) ! (wind[13] !
         wind[14])),
      wind[12] = wparity ! ~MR_IDPE,
         ; valid input parity check
      wind[11:10] = wireg[11:10],
      wind[9] = wireg[0] ! ~wparity,
         ; force correct parity
      wind[8:0] = wireg[8:0],
         ; E port parity
      eind[14] = ((eireg[7] ! eireg[6]) ! (eireg[5] !
         eireg[4])),
```

Fig. 9A-1

```
        eind[13] = ((eireg[3] ! eireg[2]) ! (eireg[1] !
           eireg[0])),
        eparity = ((eireg[9] ! eireg[8]) ! (eind[13] !
           eind[14])),
        eind[12] = eparity | ~MR_IDPE,
           ; valid input parity check
        eind[11:10] = eireg[11:10],
        eind[9] = eireg[9] ! ~eparity,
           ; force correct parity
        eind[8:0] = eireg[8:0]

1:      ; HMUX input select
        if (HCR_HISEL[1:0] = selectInv[1:0]) then (
        ; select input invalid
           HM_IN[8:0] = oinv[8:0],
           ; HM_IN_TAGS[1:0] = oinv[11:10],
           HM_IN_USYM_PAR = oinv[14],
           HM_IN_LSYM_PAR = oinv[13],
           HM_IN_PVALID = oinv[12],
```

Fig. 9A-2

```
              HM_IN_PARITY = oinv[9]),
        if (HCR_HISEL[1:0] = selectH[1:0]) then (
              ; select HMUX Indicate (ILB)
           HM_IN[8:0] = lbd[8:0],
           ; HM_IN_TAGS[1:0] = lbd[11:10],
           HM_IN_USYM_PAR = lbd[14],
           HM_IN_LSYM_PAR = lbd[13],
           HM_IN_PVALID = lbd[12],
           HM_IN_PARITY = lbd[9]),
        if (HCR_HISEL[1:0] = selectW[1:0]) then (
              ; select W Indicate
           HM_IN[8:0] = wind[8:0],
           ; HM_IN_TAGS[1:0] = wind[11:10],
           HM_IN_USYM_PAR = wind[14],
           HM_IN_LSYM_PAR = wind[13],
           HM_IN_PVALID = wind[12],
           HM_IN_PARITY = wind[9],
           cx_IN_PVALID = eind[12],
           cx_in[9:0] = eind[9:0]),
        if (HCR_HISEL[1:0] = selectE[1:0]) then (
              ; select E Indicate
           HM_IN[8:0] = eind[8:0],
           ; HM_IN_TAGS[1:0] = eind[11:10],
           HM_IN_USYM_PAR = eind[14],
           HM_IN_LSYM_PAR = eind[13],
           HM_IN_PVALID = eind[12],
           HM_IN_PARITY = eind[9],
           cx_IN_PVALID = wind[12],
           cx_in[9:0] = wind[9:0])

;   1:  ; CXC input select
   ;        if (XISEL[1:0] = selectIinv[1:0])
   ;                    ; select input invalid
   ;           then (CXID[12:0] = oinv[12:0]),
   ;        if (XISEL[1:0] = selectW[1:0]) ; select W Indicate
   ;           then (CXID[12:0] = wind[12:0]),
   ;        if (XISEL[1:0] = selectE[1:0]) ; select E Indicate
   ;           then (CXID[12:0] = eind[12:0])

1:  ; Constants
           selectInv[1:0] = 00,   ; select output invalid
           selectH[1:0]   = 01,   ; select HMUX Indicate
           selectW[1:0]   = 02,   ; select W Indicate
           selectE[1:0]   = 03,   ; select E Indicate
           oinv[14:0]     = 011E7 ; output invalid control code 1:  ; Signal input parity errors
           ESR_WIPERR <- RUN & MR_IDPE & ~wparity,
              ; signal W input parity error
           ESR_EIPERR <- RUN & MR_IDPE & ~eparity
```

Fig. 9B-1

```
                ; signal E input parity error
; Output Interface
    ; Port output bytes consist of 12 bits:
        ; out[11:10] - tag bits
        ; out[9] - odd parity over out[9:0]
        ; out[8] - control bit
        ; out[7:0] - data byte
    .CLOCK CHIP_LBC
    RUN:
        ; The following logic will change
        ; when the full CXC is implemented
        ;W port output select
        if (OCR_WOSEL[1:0] = selectInv[1:0])
                            ; select output invalid
            then (wo[11:0] = oinv[11:0]),
        if (OCR_WOSEL[1:0] = selectH[1:0])
                            ; select HMUX Indicate
            then (wo[11:0] = HM_OUT[11:0]),
        if (OCR_WOSEL[1:0] = selectW[1:0])
                            ; select W Indicate
            then (wo[11:10] = wind[11:10],
                if (wind[12])
                    then (wo[9:0] = wind[9:0]),
                    else (wo[9:0] = iperr[9:0])),
        if (OCR_WOSEL[1:0] = selectE[1:0])
        ; select E indicate
            then (wo[11:10] = eind[11:10],
                if (eind[12])
                    then (wo[9:0] = eind[9:0]),
                    else (wo[9:0] = iperr[9:0])),
        ; E port output select
        if (OCR_EOSEL[1:0] = selectInv[1:0])
                            ; select output invalid
            then (eo[11:0] = oinv[11:0]),
        if (OCR_EOSEL[1:0] = selectH[1:0])
                            ; select HMUX Indicate
            then (eo[11:0] = HM_OUT[11:0]),
        if (OCR_EOSEL[1:0] = selectW[1:0])
                            ; select W Indicate
```

Fig. 9B-2

```
            then (eo[11:10] = wind[11:10],
               if (wind[12])
                   then (eo[9:0] = wind[9:0]),
                   else (eo[9:0] = iperr[9:0])),
        if (OCR_EOSEL[1:0] = selectE[1:0])
                              ; select E indicate
            then (EO[11:10] = EIND[11:10],
                  if (eind[12])
                      then (eo[9:0] = eind[9:0]),
                      else (eo[9:0] = iperr[9:0])),
        ;HMUX loopback output select
        hmoreg[11:0] <- HM_OUT[11:0]

~RUN:
        wo[11:0] = oinv[11:0],
        eo[11:0] = oinv[11:0],
        hmoreg[11:0] <- oinv[11:0]

1:      ; Distribute outputs
        ;  W port output pins
        S_WO[9:0] = wo[9:0],
        if (OCR_WOE)
                              ; set tag open drain I/Os to
                              ; high if port disabled
            then S_WO[11:10] = wo[11:10],
            else S_WO[11:10] = 3,
        ; E port output pins
        P_EO[9:0] <- eo[9:0],
        if (OCR_EOE)
            then P_EO[11:10] <- eo[11:10],
            else P_EO[11:10] <- 3, ; HMUX loopback output
        ; check parity
        ; generate symbol parity
        lbd[14] = ((hmoreg[7] ! hmoreg[6]) ! (hmoreg[5] !
            hmoreg[4])),
        lbd[13] = ((hmoreg[3] ! hmoreg[2]) ! (hmoreg[1] !
            hmoreg[0])),
        hparity = ((hmoreg[9] ! hmoreg[8]) ! (lbd[13] !
            lbd[14])),
        lbd[12] = hparity,
                              ; valid output parity check
        lbd[11:10] = hmoreg[11:10],
        lbd[9] = hmoreg[9]! ~hparity,
                              ; force correct parity
        lbd[8:0] = hmoreg[8:0]

1:      ; Constants
        iperr[9:0] = 0323
                              ; indicate parity error control code
```

```
------------------------------------------------------------
~MR_EACP & cx_in[8]:
              ; National code points
     nols[0] = ~cx_in[6] & cx_in[5] & cx_in[4],
     usJ[0]  = (cx_in[7:4] = 0D),
     lsS[0]  = ~nols[0] & (cx_in[3:0] = 07),
     lsT[0]  = ~nols[0] & (cx_in[3:0] = 05),
     lsY[0]  = ~nols[0] & (cx_in[3:0] = 0B)
MR_EACP & cx_in[8]:
              ; Alternate code points
     nols[0] = ((cx_in[7] | ~cx_in[6]) & cx_in[5]),
     usJ[0]  = (cx_in[7:4] = 0C),
     lsS[0]  = ~nols[0] & (cx_in[3:0] = 09),
     lsT[0]  = ~nols[0] & (cx_in[3:0] = 0D),
     lsY[0]  = ~nols[0] & (cx_in[3:0] = 0B)

cx_IN_PVALID:  ; Control decodes
     cxc_SMC = usJ & lsT,
     cxc_SCC = usJ & lsY,
     cxc_SSC = usJ & lsS 1:    ph_ref1 <- cx_in[0],
            ; pos edge detect of input port 8khz ref
      ph_ref2 <- ph_ref1,
      phase_ref = ph_ref1 & ~ph_ref2

1:    ; CXC Start Delimiter Comparison
      ; or bit 0 phase ref input detect (signal to CGEN)
      CX_START = (cxc_SMC | cxc_SCC | cxc_SSC) |
          (CB_PH_SEL & phase_ref)
```

Fig. 9C-2

```
; Cycle Generation

.CLOCK CHIP_LBC
    1: ; Inputs to State Machines
       ; Resets:
       ; Master Reset causes
       ; immediate entry to the IDLE state
       ; and Idles are transmitted
       ; HMUX Reset causes an abort
       ; sequence to be transmitted
       ; followed by entry to the idle state
       CGreset = MRST | (HRST & ~(hcg3 | hcg4 | hcg5 &
          ~abort_complete)),
       step = RUN & ~CGrerset,
       reset = CGreset | step & (HCG[2:1] = 3),
       Basic = POLR_CLSS[0],
       Monitor = (POLR_CLSS[1:0] = 2),
       Sustain = Monitor & POLR_STN,
       hcc0 = (HCC[2:0] = 0),
       hcc1 = (HCC[2:0] = 1),
       hcc2 = (HCC[2:0] = 2),
       hcc3 = (HCC[2:0] = 3),
       hcc4 = (HCC[2:0] = 4),
       Hybrid = ~Basic & (hcc1 | hcc2 | hcc3 | hcc4),
       Slave = ~Basic & (hcc1 | hcc2),
       Master = Monitor & (hcc3 | hcc4),
       ; Cycle synchronization:
       ; These signals are filtered to limit
       ; transmitted cycle sync jitter
       ; The maximum rate of cycle sync phase
       ; change is limited to between
          ; 2.5 nsec per 3 cycles,
             ; which can fill or drain
             ; the LAB in approximately 23 sec
          ; 42.5 nsec per 3 cycles,
             ; which can fill or drain the
             ; LAB in approximately 1.3 sec
       Slave_Sync = ~Master & ~(Monitor & C_Flag &
          RGENERATE) &
       ((cg_ct2 & (~hcg2 | prev1 | prev2)) | cg_ct3),
       Generate_Sync = (Master | (Monitor & C_Flag &
          RGENERATE)) &
       ((cg_ct2 &
          (~hcg2 | (CCref & (prev1 | prev2)) |
             ; at least 1 of the prev 2
             ; cycles went out with 3 II
          (Master & CB_CX_REF & CX_START) |
          (prev1 & prev2 ))) |
             ; both prev cycles had 3 II
          cg_ct3),
       Maintain_Sync = afterPAmax & ( C_Flag |
          ~ANOTHER_CYCLE ) &
          ((hcc1 & Sustain & clopr) | (hcc2 & Monitor)),
```

Fig. 9D-1

```
       Frame_Ready = step & TXBASIC & FREQUEST,
       RX_Invalid = Frame_Ready & CGD_PINV,
       Start_Frame = Frame_Ready & CGD_SFS,
       Start_Abort = Frame_Ready & CGD_SAS,
       Cycle_Avail = step & ~Basic & CAVAILABLE & (Hybrid
           | Sustain),
       Cycle_Ready = step & ~Master & (CREQUEST |
           (~Sustain & CAVAILABLE)),
       CAN_ABORT = ~Master & ~Sustain & ~(hcc2 & Monitor),
       Cycle_Abort = step & CAN_ABORT & LB_GENERATE &
           ~ANOTHER_CYCLE,
       c1opr = LB_C1OPR,
       c2opr = LB_C2OPR,
       Repeat = LB_REPEAT,
       TXABORT = TX_ABORT,
       CFLAG = C_Flag,
                ; signal to TG
       TXBASIC = ~C_Flag,
       CB_TXBASIC = ~C_Flag,
       PREBASIC = HRST | Basic | TAG_BASIC | (~C_Flag &
           ~TXCYCLE) |
           (~Hybrid & ~Cycle_Avail & (Abort_Entry_Actions
                | Abort_Actions),
       TXDONE = cg42b,
   CGSR_GENERATE = RGENERATE,
   CB_CG_PT = CG_PT,    ;used to set W_flag in cbus
   CB_CCI = sync_CC,
   CGSR_CFLG = C_Flag ; Transition Conditions
      1:  ; Global Transitions
          cgn0 = reset RUN & hcg0 & ~reset:
          cg00 = RX_Invalid,
          cg01 = cg_ct2 & Start_Frame,
          cg02 = Hybrid & ~Frame_Ready & ~(Slave_Sync &
              Cycle_Ready),
          cg03 = Hybrid & ~Frame_Ready & Slave_Sync &
              Cycle_Ready,
          cg05 = Start_Abort,
          cg0n = cg00 | cg01 | cg02 | cg03 | cg05

RUN & hcg1 & ~reset:
          cg10 = RX_Invalid,
```

Fig. 9D-2

```
        cg11 = Start_Frame,
        cg12 = Hybrid & ~Frame_Ready & ~(Slave_Sync &
           Cycle_Ready),
        cg13 = Hybrid & ~Frame_Ready & Slave_Sync &
           Cycle_Ready,
        cg15 = Start_Abort,
        cg1n = cg10 | cg11 | cg12 | cg13 | cg15

RUN & hcg2 & ~reset:
        cg20 = ~Hybrid & ~Cycle_Avail & ~Start_Abort,
        cg23a = (Hybrid | Cycle_Avail) & Slave_Sync &
           Cycle_Ready,
        cg23b = (Hybrid | Cycle_Avail) & Generate_Sync,
        cg23c = (Hybrid | Cycle_Avail) & ~cg23a & ~cg23b
           & Maintain_Sync,
        cg25 = ~Hybrid & ~Cycle_Avail & Start_Abort,
        cg2n = cg20 | cg23a | cg23b | cg23c | cg25

RUN & hcg3 & ~reset:
        cg33 = ~HRST & (Hybrid | Cycle_Avail) &
           after_CStx & Cycle_Ready & (RGENERATE |
           LB_GENERATE)
           & ~Sustain & ~(hcc2 & Monitor),
        cg34 = ~( cg33 | cg35a | cg35b ) & after_Header,
        cg35a = HRST | Basic |
           (~Hybrid & ~Cycle_Avail & (LB_GENERATE |
           RGENERATE | ~Sustain)),
        cg35b = ~HRST & Hybrid & after_CStx &
           Cycle_Abort,
        cg3n = cg33 | cg34 | cg35a | cg35b RUN & hcg4 & ~reset:
        cg42b = ~( cg43 | cg45a | cg45b ) & afterCycle,
        cg43 = ~HRST & (Hybrid | Cycle_Avail) &
           Cycle_Ready &
           (RGENERATE | LB_GENERATE) & ~Sustain & ~(hcc2 &
           Monitor),
        cg45a = HRST | Basic |
           (~Hybrid & ~Cycle_Avail & (LB_GENERATE |
           RGENERATE | ~Sustain)),
        cg45b = ~HRST & Hybrid & Cycle_Abort,
        cg4n = cg43 | cg45a | cg45b ; | cg42b RUN & hcg5 & ~reset:
        cg50 = abort_complete & ~C_Flag,
        cg52 = abort_complete & C_Flag,
        cg5n = cg50 | cg52

1:  ; State Transitions
    if ( cgn0 | cg00 | cg10 | cg20 | cg50 )
        then ( HCG[2:0] <- 0, Idle_Entry_Actions = 1 ),
    if ( cg01 | cg11 )
        then ( HCG[2:0] <- 1, Repeat_Entry_Actions = 1),
```

Fig. 9E-1

```
if ( cg02 | cg12 | cg42b | cg52 )
   then ( HCG[2:0] <- 2, Preamble_Entry_Actions =
   ~cg42b ), if ( cg03 | cg13 | cg23a | cg23b | cg23c | cg33 |
   cg43 )
   then ( TXCYCLE = 1,
      if (~cg23b & ~cg23c & ~LB_CYCLE)
         then (HCG[2:0] <- 5, Abort_Entry_Actions
            = 1),
      else (HCG[2:0] <- 3, Header_Entry_Actions =
         1)), if ( cg34 )
   then ( HCG[2:0] <- 4, Body_Entry_Actions = 1 ),
if ( cg05 | cg15 | cg25 | cg35a | cg35b | cg45a |
   cg45b )
   then ( HCG[2:0] <- 5 , Abort_Entry_Actions = 1),
hcg0 = (HCG[2:0] = 0),
hcg1 = (HCG[2:0] = 1),
hcg2 = (HCG[2:0] = 2),
hcg3 = (HCG[2:0] = 3),
hcg4 = (HCG[2:0] = 4),
hcg5 = (HCG[2:0] = 5)

; State Actions
   RUN & hcg0 & ~cgn0 & ~cg0n:
      Idle_Actions = 1
   RUN & hcg1 & ~cgn0 & ~cg1n:
      Repeat_Actions = 1
   RUN & hcg2 & ~cgn0 & ~cg2n:
      Preamble_Actions = 1
   RUN & hcg3 & ~cgn0 & ~cg3n:
      Header_Actions = 1
   RUN & hcg4 & ~cgn0 & ~cg4n:
      Body_Actions = 1
   RUN & hcg5 & ~cgn0 & ~cg5n:
      Abort_Actions = 1

; Actions
   Idle_Entry_Actions:
      TAG_BASIC = 1,
      if (reset) then clear_at = 1,
```

Fig. 9E-2

```
   FORCE_INV = reset | RX_Invalid,
   FORCE_II = ~reset & ~RX_Invalid,
   TX_ABORT = FORCE_INV | ~hcg5,
   RGENERATE <- 0,
   C_Flag <- 0,
   prev1 <- 0,
   prev2 <- 0

Idle_Actions:
   READFRM = cg_ct1,
   TAG_BASIC = 1,
   FORCE_II = 1

Repeat_Entry_Actions:
   READFRM = 1,
   TAG_BASIC = 1,
   clear_at = 1

Repeat_Actions:
   READFRM = 1,
   TAG_BASIC = 1

Preamble_Entry_Actions:  ; not performed on cg42b
   TAG_REPEAT = 1,
   FORCE_II = 1,
   if (~C_Flag) then (RGENERATE <- 0)

Preamble_Actions:
   TAG_REPEAT = 1,
   FORCE_II = 1

Header_Entry_Actions:
        ; also starting delimiter actions
   TAG_REPEAT = 1,
   clear_at = 1,
   TX_START = 1,
   prev1 <- hcg2 & cg_ct3 & ~(Master & CB_CX_REF &
      CX_START),
   prev2 <- ~hcg2 | prev1 | (Master & CB_CX_REF &
      CX_START),
   CLR_W_FLAG = 1,  ; W_Flag is used to detect
      ;writes to WBCR during cg3
   if (~C_Flag | hcg3 | hcg4) then (
      TX_ABORT = 1,
      C_Flag <- 1),
   GENERATE = ~LB_CYCLE,
   RGENERATE <- GENERATE,
   CGCI = GENERATE
   if ( hcc1 | hcc2)
      then FORCE_SSC = 1,
```

```
------------------------------------------------------------
      if ( hcc3 | hcc4)
         then if (HFR_CASG)
            then ( TX_NEW = 1,
               FORCE_SCC = 1,
               HFR_CLR_CASG = 1),
            else ( FORCE_SMC = 1)

Header_Actions:
   TAG_REPEAT = 1,
   GENERATE = RGENERATE | LB_GENERATE,
   RGENERATE    <-   RGENERATE   |   (after_CStx   &
      LB_GENERATE),
   if (before_CCtx) then (
      SEND_CC = 1,
      IF (GENERATE | LB_LOST) then ( FORCE_RX = 1,
         FORCE_XR = 1),
      else (
         if (hcc0 | hcc1) then (
            FORCE_RX = ~c1opr,
            FORCE_SX = c1opr,
            FORCE_XR = ~c2opr,
            FORCE_XS = c2opr),
         if (hcc2) then (
            FORCE_RX = 1,
            FORCE_XR = 1),
         if (hcc3) then (
            FORCE_RX = 1,
            FORCE_XS = 1),
         if (hcc4) then (
            if (Repeat) then ( FORCE_SX = 1,
               FORCE_XS = 1),
               else (FORCE_SX = 1, FORCE_XR
                  = 1))
      )
   ),     ; end of before_CCtx
   if (before_CStx) then (
```

Fig. 9F-2

```
    if (hcc0 | hcc1) then (
       if (GENERATE | ~Repeat)
          then (FORCE_00 = 1,
             INC_CSREQ = 1),
       else (
          LOAD_CSREQ = c2opr,
          INC_CSREQ = ~c2opr)),
    if (hcc2) then (
       INC_CSREQ = 1,
       if (Monitor)
          then FORCE_RANK = 1,
          else FORCE_00 = 1
          ),
    if (hcc3 | hcc4) then (
       INC_CSREQ = 1,
       FORCE_CSREQ = 1 )
    )      ; end of before_CStx Body_Entry_Actions   ; this occurs during the IMC
                  ;byte
    CG34 = 1,    ; signal needed by cbus for cht, chr
    GENERATE = RGENERATE | LB_GENERATE,
    RGENERATE <- GENERATE,
        ; NOTE: we are only forcing II if
        ; GENERATE is set during the IMC
    if (GENERATE) then
       FORCE_II = 1

Body_Actions:
    GENERATE = RGENERATE | LB_GENERATE,
    RGENERATE <- GENERATE,
    ; NOTE: we are only forcing II if
        ; HTGOPR is clear during an ISO WBC
        ; GENERATE is set during an ISO WBC
    if (HTGISO & (~HTGOPR | GENERATE)) then
       FORCE_II = 1,
    if (~HTGISO & ~HTGOPR & ~CG_DPG)
       then FORCE_LL = 1

Abort_Entry_Actions:
    TX_ABORT = 1,
    if (cg35b & ~cg45b) then C_Flag <- 0

ABORT_ENTRY_Actions | Abort_Actions:
        ; send out abort sequence

; Description
; In order to insure that we send out
; Starting Delimiters separated by at least
; two non SD bytes, a separate abort state
; is used with four sub states,
; Whenever an SD is sent out, at is set to 0
```

Fig. 9G-1

```
; ----------------------------------------------------
; and then counts two bytes,
; if two is reached then the next Abort
; sequence does not require any preceding
; idles
; Should an HMUX reset occur while sending
; out the Abort Sequence,
; the abort sequence is still transmitted
; out contiguously
; a Master Reset causes the sequence to
; be terminated
; ==================================================== if (HRST | (~Hybrid & ~Cycle_Avail)) then
        C_Flag <- 0,
    TAG_REPEAT = 1,
    if ( ~at[1] ) then ( ; at 0 or at = 1
        FORCE_II = 1 ),
    if ( at[1:0] = 2) then ( ;SAS
        FORCE_SAS = 1,
        at <- 3),
    if ( at[1:0] = 3) then ( ;TT
        FORCE_TT = 1,
        abort_cmp = 1,
            ; this triggers the next transition
        at <- 1); set to 1 to be ready for the next
            ; abort sequence 1:  ; abort timing sequence
    if ( clear_at) then at <- 0,
    else (
        if (at[1:0] = 0) then at <- 1,
        if (at[1:0] = 1) then at <- 2), abort_complete <- abort_cmp
    ; note that if at = 2 then at only increments
    ; if an SAS is sent out 1:  ; Counter
    if ( cgn0 | (cg0n & ~cg02) | cg1n | (cg2n & ~cg20)
        | cg3n | cg4n |
        cg42b | cg5n | ; on (almost) any transistion
        (hcg1 & ~CGD_II))  ; if not repeating II
            then ( cg_ct[10:0] <- (~CG34 & ~cg42b &
                FORCE_II)), else if ( ~CG_IMC & ~CG_DPG & (hcg3 | hcg4 |
    ~cg_ct7) )
                ; sticky counter
```

Fig. 9G-2

```
        then (cg_ct <- cg_ct + 1),
    cg_ct1 = cg_ct[3] | cg_ct[2] | cg_ct[1] | cg_ct[0],
            ; cg_ct >= 1
    cg_ct2 = cg_ct[3] | cg_ct[2] | ct_ct[1],
            ; cg_ct >= 2
    cg_ct3 = cg_ct[3] | cg_ct[2] | cg_ct[1] & ct_ct[0],
            ; cg_ct >= 3
    cg_ct4 = cg_ct[2],       ; ct_ct >= 4
    cg_ct5 = cg_ct[2] & (cg_ct[1] | cg_ct[0]),
            ; cg_ct >= 5
    cg_ct6 = cg_ct[2] & cg_ct[1],    ; cg_ct >= 6
    cg_ct7 = cg_ct[2] & cg_ct[1] & cg_ct[0],
            ; cg_ct >= 7
    CG_INDEX[3:0] = cg_ct[3:0],
    if (~hcg3 & ~hcg4) then (CG_DPG <- 0)

hcg2:  ; PA MAX detection
    afterPAmax = cg_ct3
            ; constant here because of IBO bias in LAB
    ; if ( (HCR_PAMAX[1:0] = 0))
      ; then ( afterPAmax = cg_ct4 ),
            ; PA_Max = 3+1 bytes
    ; if ( (HCR_PAMAX[1:0] = 1) )
      ; then ( afterPAmax = cg_ct5 ),
            ; PA_Max = 4+1 bytes
    ; if ( (HCR_PAMAX[1:0] = 2) )
      ; then ( afterPAmax = cg_ct6 ),
            ; PA_Max = 5+1 bytes
    ; if ( (HCR_PAMAX[1:0] = 3) )
      ; then ( afterPAmax = cg_ct7 )
            ; PA_Max = 6+1 bytes hcg3:  ; signals used during hcg3
    ; note that before_ refers to the current byte
    before_CCtx = (cg_ct[3:0] = 0),
    after_CCtx = ~before_CCtx,
    before_CStx = (cg_ct[3:0] = 1),
    after_CStx = ~before_CCtx & ~before_CStx,
    after_PT = (cg_ct[3:0] = 09),
    after_Header = (cg_ct[3:0] = 0A),
    CG_CC = before_CCtx,
    CG_CS = before_CStx,
    CG_PT = after_CStx & ~after_Header,
    PRE_IMC = after_PT,
    CG_IMC = after_Header,
    CG_DPG <- CG_IMC & ~TX_ABORT hcg4:  ; signals used during hcg4
    CG_BODY = 1,
    LAST_CG = (DMR_HTM & MR_DIAG) | (cg_ct[10:4] = 5F),
    PRE_DPG = ~LAST_CG & (cg_ct[6:4] = 07),
```

Fig. 9H-1

```
------------------------------------------------------------
     CG_DPG <- PRE_DPG & (cg_ct[3:0] = 0F) & ~TX_ABORT,
     afterCycle = LAST_CG & (cg_ct[3:0] = 0F),
        ; (cg_ct[10:0] = 5FF) -> payload
        ; byte # 1536-1 for full cycle
        ; (cg_ct[3:0] = 0F) -> payload
        ; byte #16-1 at end of 1st CG for test cycle
     beforeMiddle =
        ~(DMR_HTM & MR_DIAG) & (cg_ct[10:0] = 2F7) |
            ; payload byte # 764-3-1
        DMR_HTM & MR_DIAG & (cg_ct[3:0] = 00),
        ; payload byte #4-3-1
     afterMiddle =
        ~(DMR_HTM & MR_DIAG) & (cg_ct[10:0] = 2FE) |
            ; payload byte # 764+3-1
        DMR_HTM & MR_DIAG & (cg_ct[3:0] = 06)
        ; payload byte #4+3-1

1:      ; Cycle Clock Reference detector
     sync_CC0 <- CYCLE_CLOCK,
     sync_CC1 <- sync_CC0,
     sync_CC = sync_CC0 & ~sync_CC1,
     if (Master & CB_CX_REF)
        then (new_ref = CX_START),
        else (new_ref = sync_CC),
     if (MRST | HRST)
        then (CCref <- 0, old_ref <- 0),   ; reset
     else if (beforeMiddle)   ; close sampling window
        then (old_ref <- CCref, CCref <- 0),
              ; remember direction
     else if (afterMiddle & CCref)
              ; open sampling window
        then (CCref <- old_ref),
              ; restore direction
     else if (new_ref) ; sample
        then (CCref <-1)

; End of hcg rt1
```

Fig. 9H-2

APPARATUS AND METHODS FOR PROVIDING AN INTERFACE BETWEEN FDDI-II RINGS

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

The present invention relates to communication networks, and more particularly to providing an interface between FDDI-II communication rings.

A Fiber Distributed Data Interface FDDI-II network is a high-performance general purpose local area ring network designed for efficient operation with a peak data rate of 100 Mbit/s. FDDI-II time-division-multiplexes isochronous and packet data. An FDDI-II ring may have hundreds of nodes operating over an extent of tens of kilometers.

It is desirable to provide a simple and efficient interface between FDDI-II rings. The interface preferably should not require a large amount of data buffering or frequent cycle slips. (A cycle slip consists in generating a fake cycle or discarding some data. Cycle slips are sometimes needed to satisfy timing requirements of a network or to recover from error conditions such as, for example, a network buffer overflow or underflow.)

SUMMARY OF THE INVENTION

The present invention provides apparatus and methods that allow interface between FDDI-II rings. In some embodiments, two FDDI-II rings are phase and frequency aligned at the station at which the interface is provided. The data are exchanged, if at all, by exchanging symbols having the same position, that is, the same offset, in the aligned cycles on the two rings. Therefore, data buffering is minimized.

The phase alignment is achieved in some embodiments as follows. A hybrid multiplexer ("HMUX") on one of the rings ("first" ring) monitors the output of a hybrid multiplexer on the other ring ("second" ring). When the hybrid multiplexer of the first ring detects a cycle starting delimiter on the output of the hybrid multiplexer of the second ring, the hybrid multiplexer of the first ring starts a cycle on the first ring. The cycle on the second ring is delayed to allow the cycle on the first ring to catch up with the cycle on the second ring. The cycles on the two rings become phase aligned as a result.

The two cycles are then delivered to a switch that selectively exchanges the cycle bytes that have the same position in the two cycles. The switch exchanges or otherwise routes the bytes in accordance with a table that indicates for each byte position whether the respective bytes must be exchanged, whether the bytes must not be exchanged but the byte on each ring must remain on the same ring, whether the first ring byte must be discarded and the second ring byte must be routed to both rings, or whether the second ring byte must be discarded and the first ring byte must be routed to both rings. Because the switch processes at any given time bytes in the same positions in the two cycles and because the cycles are phase aligned, no buffering is needed.

Each hybrid multiplexer ("HMUX") uses an 8 KHz reference to mark the beginning of each cycle produced by the HMUX, as the cycles in FDDI-II must be produced at the 8 KHz frequency (8,000 cycles per second). In some embodiments, each of the two HMUXes uses its own 8 KHz reference "CCI" (cycle clock indicate) to receive data from the ring. The two CCI references may have slightly different frequencies. In order to frequency align the cycles produced by the two HMUXes, single frequency 8 KHz references ("CCRs", or cycle clock requests) are generated and used by both HMUXes for cycle output. The frequency of the CCR references is the frequency of one of the two CCI references of the two HMUXes.

Latency adjustment buffers ("LABs") in the two hybrid multiplexers buffer data to accommodate the fact that the respective hybrid multiplexers may receive data at one rate (CCI) and transmit data at a different rate (CCR). The LABs are managed so as to reduce the frequency of cycle slips.

The present invention is suitable for exchanging data between a local FDDI-II ring and a backbone FDDI-II ring.

Other features of the invention are described below. The invention is defined by the appended claims.

BRIEF DESCRIPTION OF THE DRAWINGS

FIGS. 9A–9H show equations for a portion of the hybrid multiplexer of FIG. 5.

DESCRIPTION OF THE PREFERRED EMBODIMENTS

Figure 1:
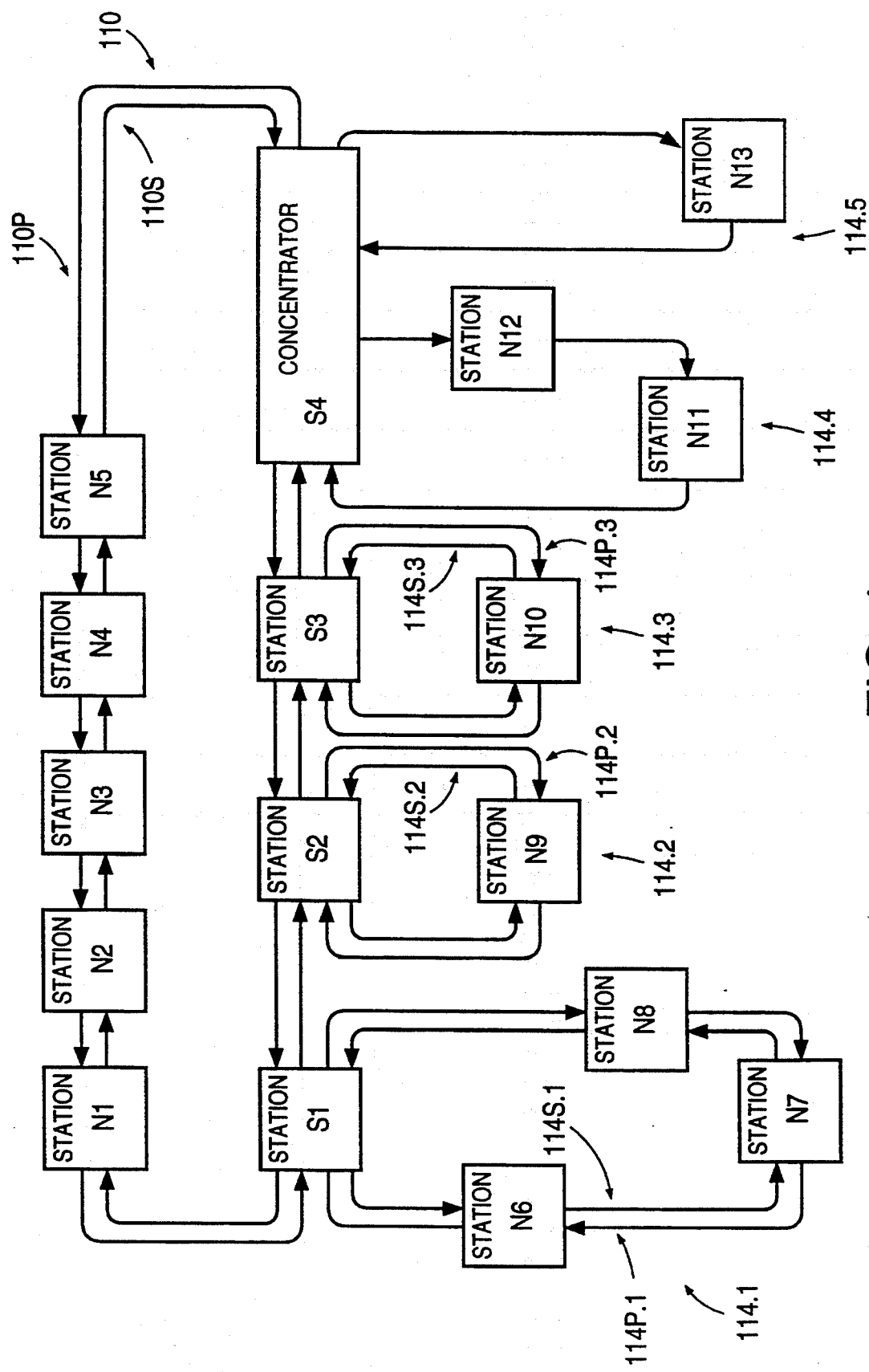
FIG. 1 is a block diagram of an FDDI-II multi-ring network that utilizes the present invention.

FIG. 1 is a block diagram of an FDDI-II network that includes backbone ring 110 and local rings 114.1 through 114.5. The backbone ring is formed by stations N1 through N5 and S1 through S4. Local ring 114.1 is formed by stations S1, N6, N7, NS. Local ring 114.2 is formed by stations S2, N9. Local ring 114.3 is formed by stations S3, N10. Local ring 114.4 is formed by stations S4, N11, N12. Station S4 is a concentrator. Local ring 114.5 is formed by stations S4, N13.

Backbone ring 110 includes two counter-rotating FDDI-II rings: primary ring 110P and secondary ring 110S. Primary ring 110P is shown as a counter-clockwise ring in FIG. 1. Secondary ring 110S is shown as a clockwise ring. The designations "primary ring" and "secondary ring" are assigned arbitrarily and are interchangeable.

Local ring 114.1 includes primary ring 114P.1 shown as a clockwise ring and secondary ring 114S.1 shown as a counter-clockwise ring. Local ring 114.2 includes primary ring 114P.2 shown as a clockwise ring and secondary ring 114S.2 shown as a counter-clockwise ring. Ring 114.3 includes primary ring 114P.3 shown as a clockwise ring and secondary ring 114S.3 shown as a counter-clockwise ring.

Each local ring 114.4, 114.5 is a unidirectional ring.

Each ring 110P, 110S, 114P.1, 114S.1, 114P.2, 114S.2, 114P.3, 114S.3, 114.4, 114.5 uses the FDDI-II Hybrid Ring Control ("HRC") protocol.

FDDI-II is described, for example, in *FDDI Hybrid Ring Control (HRC), Working Draft Proposed American National Standard,* American National Standards Institute ("ANSI"), May 28, 1992 incorporated herein by reference.

Each station N1 through N13 is an FDDI-II station constructed according to the FDDI-II ANSI standards known in the art. See, for example, *FDDI-II Hybrid Ring Control,* supra. One or more of nodes N1 through N12 are repeater stations in some embodiments. One or more of stations N1 through N13 are connected to a wide area network in some embodiments.

Figure 2:
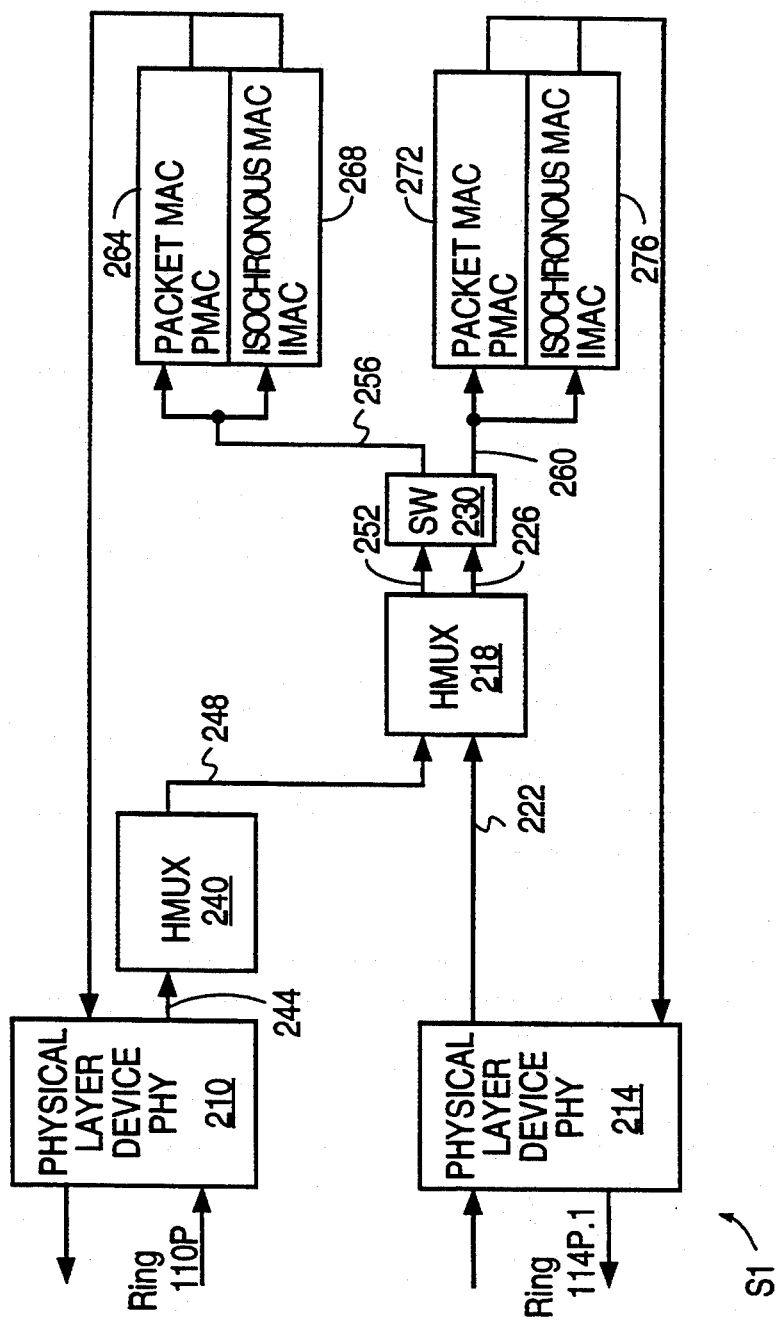
FIG. 2 is a block diagram of a portion of a station of the network of FIG. 1.

FIG. 2 is a block diagram of a portion of one embodiment of station S1. Stations S2, S3 have similar portions. The station portion of FIG. 2 provides an interface between the backbone and local primary rings 110P, 114P.1. Similar circuitry (not shown) in station S1 provides an interface between secondary rings 110S, 114S.1 in some embodiments. In other embodiments, an interface between secondary rings 110S, 114S.1 is not provided.

The incoming link of backbone ring 110P is connected to an input of physical layer device ("PHY") 210. The outgoing link of backbone ring 110P is connected to an output of PHY 210. The two links are connected to PHY 210 through a physical medium dependent layer device (not shown).

Similarly, the incoming and outgoing links of local ring 114P.1 are connected, respectively, to an input and an output of PHY 214 through a physical medium dependent layer device (not shown). Physical layer devices 210, 214 operate in some embodiments according to *FDDI Physical Layer Protocol (PHY-2), Draft Proposed American National Standard,* ANSI, Jun. 17, 1992 incorporated herein by reference. In some embodiments, one or both devices 210, 214 are of type Player+ (Trademark) or Player-2S (Trademark) that are available from National Semiconductor Corporation of Santa Clara, Calif.

Hybrid multiplexer 218 performs the hybrid multiplexer functions for local ring 114P.1, repeating the received cycles and generating new cycles as needed. HMUX 218 receives HRC cycles from ring 114P.1 on input 222 connected to PHY 214 and provides HRC cycles on output 226 connected to switch 230. Output 226 includes in some embodiments eight bits for a pair of FDDI symbols, a control bit to indicate whether the symbol pair is control symbols or data symbols, a parity bit, and two tag bits that indicate whether the symbol pair destination is a packet MAC (packet Medium Access Controller), an isochronous MAC, whether the symbol pair should be repeated, or whether the symbol pair is provided in basic mode.

Hybrid multiplexer 240 performs the hybrid multiplexer functions for backbone ring 110P. HMUX 240 receives HRC cycles from ring 110P on input 244 connected to PHY 210 and provides HRC cycles on output 248 connected to an input of HMUX 218. In some embodiments, output 248 includes eight bits for a symbol pair, a control bit to indicate whether the symbol pair is control or data symbols, a parity bit, and two tag bits, similar to output 226.

HMUX 218 passes signals from input 248 to output 252 connected to switch 230. HMUX 218 uses signals on input 248 to phase align local ring 114P.1 to backbone ring 110P. HMUX 218 phase aligns the two rings so that the HRC cycle starting delimiters of the two rings appear on the respective outputs 252, 226 simultaneously. Further, for each given position in the cycle, the bytes in that position in the two rings appear on outputs 252, 226 simultaneously.

Switch 230 selectively exchanges bytes between rings 110P, 114P.1. Switch 230 includes a table that defines, for each byte position in an HRC cycle, whether for that position switch 230 should: (1) route the signals from input 252 to the backbone ring output 256 and from input 226 to the local ring output 260; (2) exchange the bytes, that is, route the signals from input 252 to local ring output 260 from input 226 to backbone ring output 256; (3) route the signals from input 252 to backbone ring output 256 and local ring output 260, discarding the local ring symbols on input 226; or (4) route the signals from input 226 to outputs 256 and 260, discarding the backbone ring signals on input 252. The table is programmed into switch 230 by a station S1 microprocessor (not shown).

Switch 230 does not buffer (i.e., accumulate) the bytes that it routes. Buffering is not needed because the two rings are phase aligned on the switch inputs 252, 226 and because the switch 230 routing operates on bytes at the same cycle offset.

Each output 256, 260 of switch 230 includes eight bits for a symbol pair, a control bit, a parity bit, and two tag bits, similarly to outputs 252, 226. Output 256 is connected to packet MAC 264 and isochronous MAC 268 whose outputs are connected to PHY 210. MACs 264, 268 perform the media access control functions for backbone ring 110P.

Similarly, output 260 is connected to packet MAC 272 and isochronous MAC 276. The outputs of MACs 272, 276 are connected to PHY 214. MACs 272, 276 perform the media access control functions for local ring 114P.1.

In some embodiments, the outputs of backbone MACs 264, 268 are connected to a different PHY (not shown) whose output is connected to the outgoing link of backbone ring 110P. That different PHY receives also signals on the incoming link of the backbone secondary ring 110S. PHY 210 is connected to the outgoing link of ring 110S. Such topology is described in *FDDI Station Management-2 Isochronous Services (SMI-2-IS), Working Draft Proposed American National Standard,* ANSI, May 12, 1993 incorporated herein by reference. In some embodiments, such topology is used in local ring 114.1. In particular, in some embodiments the outputs of MACs 272, 276 are connected to a different PHY (not shown).

In some embodiments, the outputs of MACs 264, 268 are connected to PHY 214. The outgoing link of backbone ring 110P is connected to PHY 214 rather than PHY 210. The outgoing link of local ring 114P.1 is connected to PHY 210, and so are the outputs of MACs 272, 276.

Figure 3:
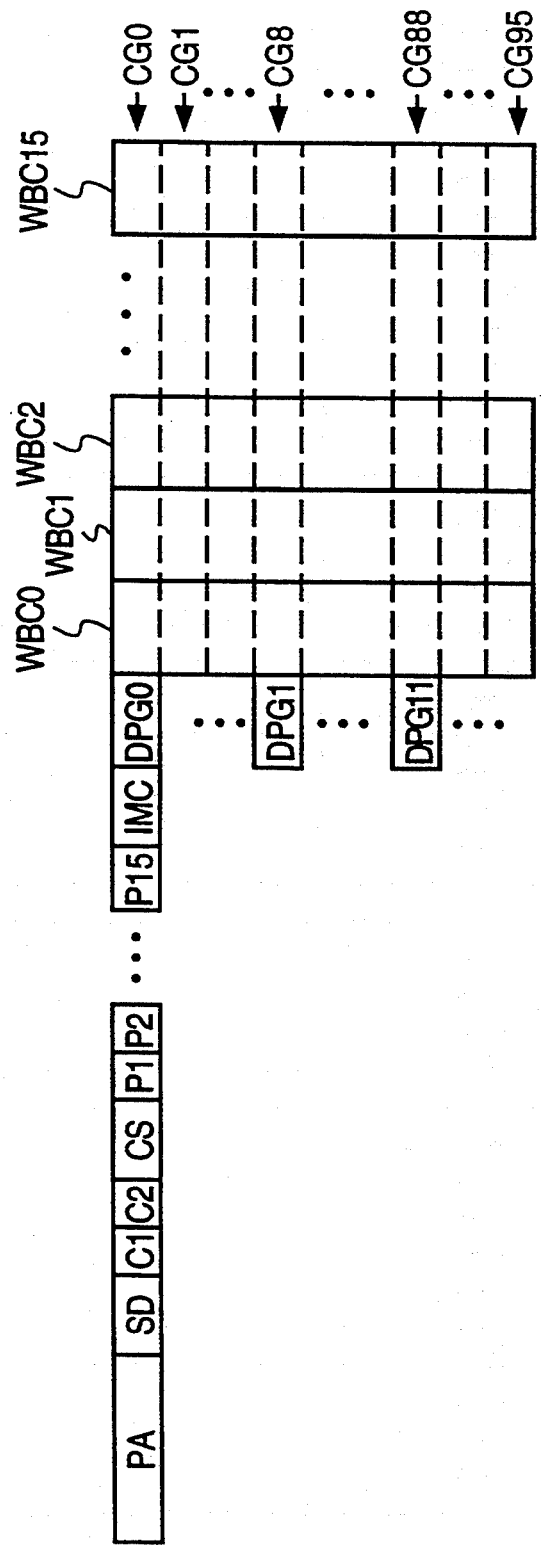
FIG. 3 illustrates an FDDI-II cycle format.

FIG. 3 illustrates an FDDI-II Hybrid Ring Control cycle. FDDI-II HRC cycles are described in *FDDI Hybrid Ring Control,* Supra. The cycle is preceded by a preamble PA. The cycle starts with the cycle header which includes a 2-symbol starting delimiter SD, synchronization and sequence control symbols C1 and C2, a cycle sequence CS (2 symbols), a programming template ("PT") P0 through P15 (16 symbols), and an isochronous maintenance channel IMC (2 symbols). Then follows a byte DPG0 of the dedicated packet group ("DPG"). Then follows cyclic group 0 ("GG0") consisting of the first bytes of Wide Band Channels ("WBCs") WBC0 through WBC15. Then follows cyclic group 1 consisting of the second bytes of the wide band channels. Then follows cyclic group 2 ("CG2"), and so on through cyclic group 95 ("CG95"). One of bytes DPG0 through DPG11 of the dedicated packet group appears immediately before every eighth cyclic group.

Each programming template symbol Pi specifies whether the corresponding WBC WBC1 is allocated for packet or isochronous data.

The interface of FIG. 2 allows increasing the aggregate isochronous bandwidth. For example, suppose that WBC WBC1 is allocated for isochronous connection between stations N1, N9 on primary rings 110P, 114P.2. Switch 230 of station S2 is then programmed to exchange the WBC1 bytes. At the same time, switch 230 of station S1 is programmed to pass through the WBC1 byes, that is, to route data from input 252 to output 256 and from input 226 to output 260. Hence, channel WBC1 on local ring 114P.1 is available for isochronous connection between stations S1, N6, N7, NS. The aggregate isochronous bandwidth is increased as a result.

The data security is improved because the WBC WBC1 transferred between stations N1, N9 is not available to local ring 114.1. This WBC may also be made unavailable to local rings 114.3, 114.4, 114.5 by suitably programming the switches in respective stations S3, S4. The data security is improved also because the WBC WBC1 on local ring 114P.1 is unavailable to local rings 114.2 through 114.5 and to backbone ring 110.

The fault recovery is facilitated. Indeed, suppose that ring 110P corrupts WBC WBC1. Such corruption does not affect local rings 114.1. Such corruption also does not affect local rings 114.3, 114.4, 114.5 if WBC WBC1 of ring 110P does not appear on these local rings. Conversely, if, for example, ring 114P.1 corrupts its WBC WBC1, backbone ring 110 and local rings 114.2 through 114.5 are not affected.

Figure 4:
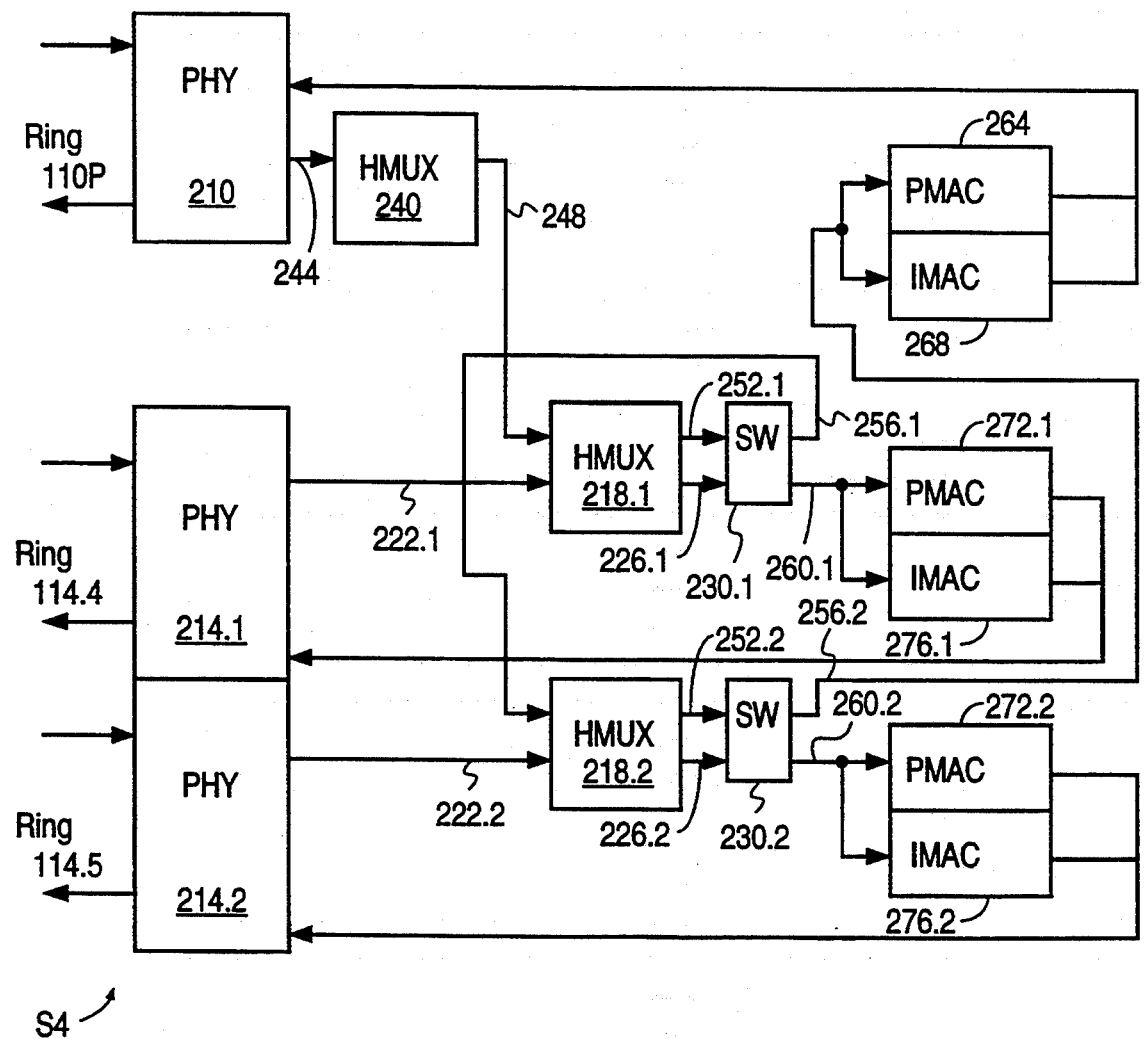
FIG. 4 is a block diagram of a portion of a concentrator station of FIG. 1.

FIG. 4 illustrates a portion of concentrator station S4 which portion allows exchanging data between primary backbone ring 110P and local rings 114.4, 114.5. The incoming and outgoing links of ring 110P are connected to PHY 210. The incoming and outgoing links of ring 114.4 are connected to PHY 214.1. The incoming and outgoing links of ring 114.5 are connected to PHY 214.2. Hybrid multiplexers 240, 218.1, 218.2 perform the hybrid multiplexer functions for respective rings 110P, 114.4, 114.5. HMUX 218.1 receives HRC cycles from PHY 214.1 on input 222.1 and provides HRC cycles on output 226.1 connected to switch 230.1. HMUX 240 receives HRC cycles from PHY 210 on input 244 and provides HRC cycles on output 248 connected to an input of HMUX 218.1. HMUX 218.1 passes signals from input 248 to output 252.1 connected to switch 230.1. HMUX 218.1 phase aligns local ring 114.4 to backbone ring 110P similarly to HMUX 218 of FIG. 2. Thus the ring 114.4 cycles on output 226.1 and the backbone ring cycles on output 252.1 are phase aligned. Switch 230.1 includes a table, programmed by a microprocessor (not shown) of station S4, that defines for each byte position in an HRC cycle the byte routing similarly to the table of switch 230.

The local ring output 260.1 of switch 230.1 is connected to the inputs of packet MAC 272.1 and isochronous MAC 276.1. The outputs of MACs 272.1, 276.1 are connected to PHY 214.1.

The backbone ring output 256.1 of switch 230.1 is connected to an input of HMUX 218.2. HMUX 218.2 receives HRC cycles from PHY 214.2 and provides HRC cycles on output 226.2 connected to switch 230.2. HMUX 218.2 phase aligns ring 114.2 to the cycles on output 256.1. Thus the ring 114.5 cycles on output 226.2 and the cycles on output 252.2 are phased aligned. HMUX 240 outputs 252.2, 226.2 are connected to inputs of switch 230.2. Switch 230.2 includes a table, programmed by a microprocessor (not shown) of station S4, that defines for each byte position in an HRC cycle the byte routing similarly to the table of switch 230. Output 256.2 of switch 230.2 is connected to the inputs of the backbone ring packet and isochronous MACs 264, 268. The outputs of MACs 264, 268 are connected to PHY 210.

Output 260.2 of switch 230.2 is connected to the inputs of packet MAC 272.2 and isochronous MAC 276.2. The outputs of MACs 272.2, 276.2 are connected to PHY 214.2.

Output 260.1 of switch 230.1 is connected to the inputs of packet MAC 272.1 and isochronous MAC 276.1. The outputs of MACs 272.1, 276.1 are connected to PHY 214.1.

Cycle bytes from the backbone ring 110P can be routed through switch 230.1 to ring 114.4 or, through switches 230.1, 230.2, to ring 114.5 or backbone ring 110P. Ring 114.4 bytes can be routed through switch 230.1 back to ring 114.4 or, through switches 230.1, 230.2, to ring 114.5 or ring 110P. Ring 114.5 bytes can be routed through switch 230.2 to ring 114.5 or backbone ring 110P.

In some concentrator embodiments, the outputs of MACs 264, 268 in FIG. 4 are connected to a different PHY (not shown), as explained above for station S1 in connection with FIG. 2. In other embodiments, the outputs of MACs 264, 268 are connected to PHY 214.1 or 214.2, and the outputs of the MACs of respective ring 114.4 or 114.5 are connected to PHY 210. In some embodiments, the outputs of MACs 272.1, 276.1 are connected to PHY 214.2 and the outputs of MACs 272.2, 276.2 are connected to PHY 214.1.

In some embodiments, one or more of switches 230, 230.1, 230.2 in stations S1 through S4 are programmed to exchange all packet data. Thus, the DPG channel and those WBCs that are allocated for packet traffic are always exchanged by such switches.

In some embodiments, one or more of switches 230, 230.1, 230.2 in stations S1 through S4 are programmed so as not to exchange packet data. The packet data on backbone ring 110P are routed to ring 110P, and the packet data on the respective local ring 114.i remain on the local ring.

The system of FIG. 1 is quite flexible in that it can be configured as a variable number of logical rings. For example, if switches 230 of stations S1, S2, S3 and switches 230.1, 230.2 of concentrator S4 exchange all data, rings 114P.1, 114P.2, 114P.3, 114.4, 114.5, and 110P become part of one logical ring. Alternatively, if switch 230 in station S1 routes all the backbone data to backbone ring 110P and all the data on ring 114P.1 to ring 114P.1, rings 114P.1 and 110P become separate logical rings.

Independent configurations are obtained for the primary and secondary rings of the rings 110, 114.1, 114.2, 114.3. Thus, in some embodiments, the primary rings are part of one logical ring while the secondary rings are logically separate.

In some embodiments, the tables in one or more switches 230, 230.1, 230.2 in stations S1 through S4 do not specify the routing for each byte position in a cycle, but rather specify routings of selected bytes. In some embodiments, one or more tables specify routing of separate symbols, rather than whole bytes, in selected symbol positions. Thus different symbols in the same byte may be routed differently. In some embodiments, one or more tables specify routing of one or more whole WBCs without specifying routings for separate bytes or symbols within the WBCs. At any rate, if the table specifies routing for a whole byte or a whole WBC but not separately for a symbol, the table does in fact specify the routing for each symbol in the byte or WBC.

If a table specifies routing for less than all symbols in a cycle, the remaining symbols are exchanged in some embodiments. In other embodiments, the remaining symbols are passed through, or the symbols from one of the rings are broadcast to both rings. In some embodiments, different symbols whose routing is not defined in the table are routed differently depending on the symbol position.

In some embodiments, the packet data are always exchanged by all switches 230, 230.1, 230.2 in stations S1 through S4. Requests to establish connection between different stations and to program the switches in stations S1 through S4 are handled via the packet channel which includes the DPG channel and those WBCs that are allocated for packet data.

In some embodiments, one or both of rings 114.4, 114.5 can exchange data with ring 110S.

Figure 5:
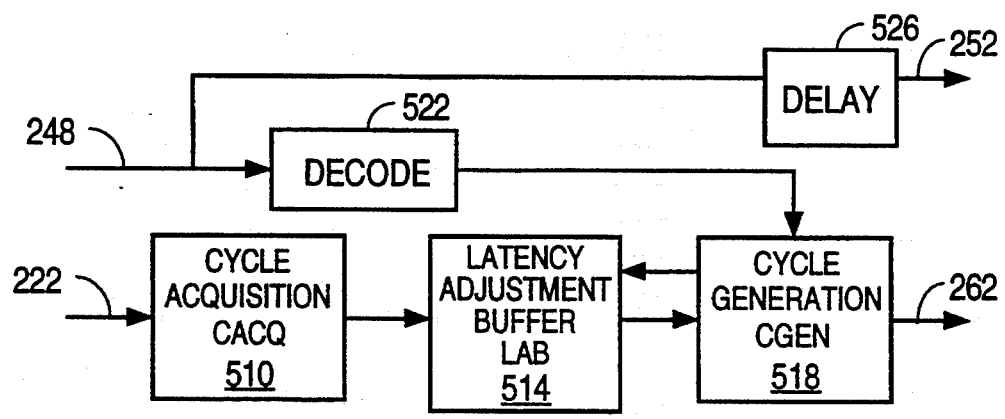
FIG. 5 is a block diagram of a hybrid multiplexer used in the stations of FIGS. 2 and 4.

FIG. 5 illustrates hybrid multiplexer 218. HMUXes 218.1, 218.2 are similar in some embodiments. HMUX 218 includes cycle acquisition circuit 510, latency adjustment buffer 514, and cycle generation circuit 518 which operate substantially according to *FDDI HYBRID RING CONTROL (HRC)*, supra. Input 222 is connected to cycle acquisition circuit 510, and output 226 is connected to cycle generation circuit 518. The cycle distribute function specified in the *FDDI Hybrid Ring Control*, supra, is implemented by the output 226 tag lines described above. The cycle merge function specified in the *FDDI Hybrid Ring Control*, supra, is implemented by the tristate outputs of the respective MACs such as MACs 272, 276.

Input 248 is connected to decoder 522 whose output is connected to cycle generation circuit 518. When decoder 522 detects a starting delimiter on input 248, decoder 522 asserts a signal to cycle generation circuit 518. Cycle generation circuit 518 aborts output of the current cycle, if any, and provides on output 226 a two-byte preamble followed by a new cycle. Delay circuit 526 provides a delay between input 248 and output 252 so that when the cycle from input 248 appears on output 252, that cycle's starting delimiter and the starting delimiter of the new cycle produced by circuit 518 appear on outputs 252, 226 simultaneously.

In some embodiments, the two cycles are aligned gradually not to force cycle generation circuit 518 to abort a cycle. LAB 514 is used for buffering. The preamble length on the local ring is manipulated to gradually shift the local ring cycles relative to the backbone ring cycles until the two rings are aligned. More particularly, FDDI-II requires the preamble length to be on the average 2.5 bytes per cycle. In some embodiments, each preamble has either two or three bytes. In some embodiments, cycle generation circuit 518 generates a two-byte preamble for each cycle for which at least one of the following three conditions is met:

(1) decoder 522 detects a starting delimiter while cycle generation circuit 518 is generating the first or second byte of the preamble;

(2) decoder 522 detected a starting delimiter while cycle generation circuit 518 was producing the second half of the last cycle, and at least one of the last two cycles produced by circuit 518 had a three-byte preamble;

(3) the last two cycles produced by cycle generation circuit 518 each had a three-byte preamble, independent of when the starting delimiter is detected by decoder 522.

If none of conditions (1), (2), (3) is met, cycle generation circuit 518 generates a three-byte preamble.

Thus cycle generation circuit 518 favors a two-byte preamble if decoder 522 detects a starting delimiter while cycle generation circuit 518 generates the first half of a cycle, and cycle generation circuit 518 favors a three-byte preamble if decoder 522 detects a starting delimiter when cycle generation circuit 518 generates the second half of a cycle. Fast phase alignment is thereby achieved.

In some embodiments, HMUX 218 is of type DP83260 (Trademark) available from National Semiconductor Corporation. FIGS. 9A–9H show equations for a portion of such a hybrid multiplexer that are written in a hardware description language RTL.

HMUX 240 is in some embodiments a conventional hybrid multiplexer with or without a LAB. In some embodiments in which PHY 210 is of type PLAYER-2S described above, multiplexer 240 is omitted as the device of type PLAYER-2S includes a hybrid multiplexer without a LAB. In some embodiments, multiplexer 240 is identical to multiplexer 218 but is programmed to disable the phase aligning functions described above.

Figure 6:
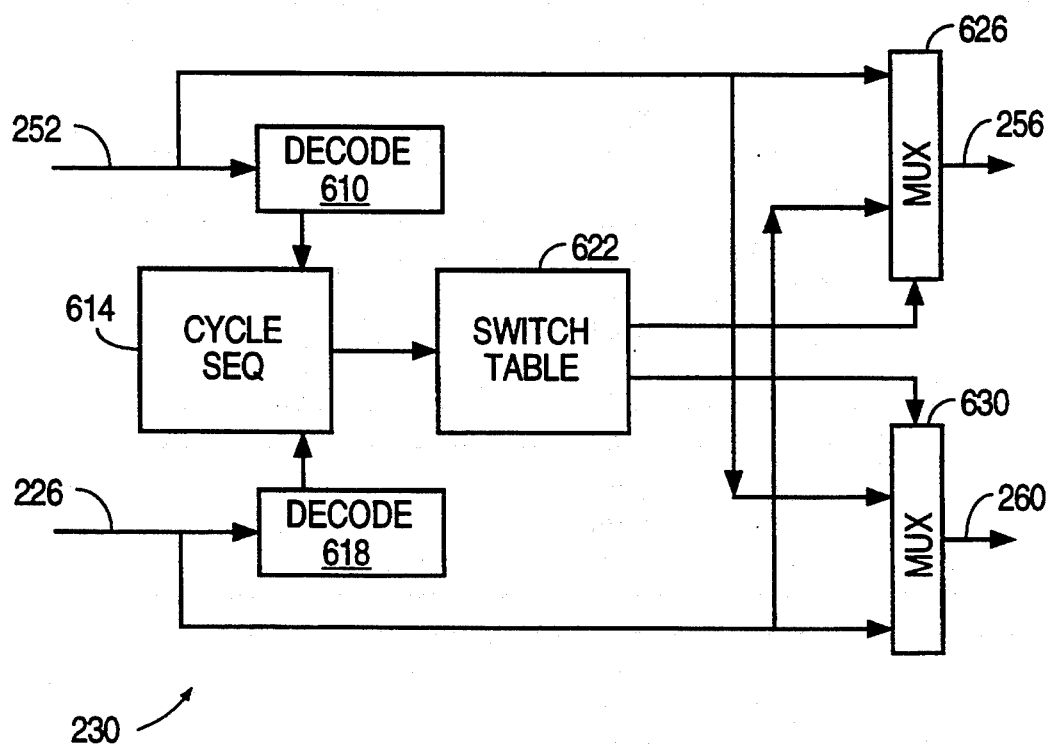
FIG. 6 is a block diagram of a switch used in the stations of FIGS. 2 and 4.

FIG. 6 illustrates one embodiment of switch 230. Switches 230.1, 230.2 are similar in some embodiments. When decoder 610 detects a starting delimiter on input 252, decoder 610 signals cycle sequence circuit 614. When decoder 618 detects a starting delimiter on output 226, decoder 618 signals cycle sequence circuit 614. When cycle sequence circuit 614 receives the starting delimiter signals from decoders 610, 618 simultaneously, the respective rings are phase aligned. Circuit 614 then uses a byte clock to count cycle bytes and sends the cycle byte count to switch table circuit 622. Switch table circuit 622 asserts select signals to multiplexers 626, 630 in accordance with the switch table programmed into circuit 622. The select signals cause each multiplexer 626, 630 to select either input 252 or input 226 and provide the signals on the selected input to the respective output 256, 260.

In some embodiments, each input 252, 226 supplies one symbol at a time rather than a byte at a time; circuit 614 counts symbols rather than bytes and sends a symbol count to switch table circuit 622. In some embodiments, each multiplexer 626, 630 can select one symbol from input 252 and one symbol from input 226 and provide the combination of the two symbols on respective output 256, 260. In some such embodiments in which each input 252, 226 supplies one byte at a time, each multiplexer 626, 630 includes circuitry that generates the correct parity bit.

When the cycles on inputs 252, 226 have not yet been aligned, switch table circuit 622 causes multiplexer 626 to select input 252 and multiplexer 630 to select input 226, so that all the data are passed through.

In some embodiments, once the two rings are aligned, switch table circuit 622 is programmed to transfer the programming template bytes on input 252 to both outputs 256, 260 so that the cycles on both rings have the same programming template. In some embodiments, switch table circuit 622 is programmed to exchange packet data between the two rings.

In some embodiments, switch table circuit 622 exchanges the packet data independently of the contents of the switch table. More particularly, each decoder 610, 618 monitors the programming template of the respective cycle and counts the cycle bytes to determine whether each cycle byte is a packet byte or an isochronous byte. Each decoder 610, 618 asserts for each byte a signal to circuit 614 to indicate whether the respective byte is a packet byte or an isochronous byte. Cycle sequence circuit 614 passes both such signals to switch table circuit 622. When both signals indicate packet bytes, switch table circuit 622 causes multiplexers 626, 630 to exchange the bytes.

In some embodiments, switch table circuit 622 is programmed to pass the packet data through.

In some embodiments, switch table circuit 622 is programmed to pass through the programming templates. When the signals from cycles sequence circuit 614 indicate that both bytes are isochronous or both are packet, switch table circuit 622 routes the bytes in accordance with the switch table. If one byte is packet and the other one is isochronous, switch table circuit 622 passes the bytes through.

In some applications, the programming templates on the two rings typically coincide and hence the bytes appearing simultaneously on outputs 252, 226 are typically both packet or both isochronous. However, if a programming template on one of the two rings is changed, one of the two bytes may be a packet byte while the other one of the two bytes may be isochronous.

In some embodiments, when the two rings have been aligned, switch table circuit 622 processes synchronization control symbol C1 (FIG. 3) and sequence control symbol C2 as follows. If at least one of symbols C1 on outputs 252, 226 is R (meaning that synchronization has not been established), switch table circuit 622 causes multiplexers 626, 630 to provide R on outputs 256, 260. If both symbols C1=S (synchronization has been established), multiplexers 626, 630 provide S on outputs 256, 260. Inputs 252, 226 are connected to switch table circuit 622 to allow the switch table circuit to examine the synchronization control symbols. Multiplexers 626, 630 include circuitry (not shown) that provides the correct parity bit.

Similarly, if at least one symbol C2=R (cycle sequence has not been established), switch table circuit 622 causes multiplexers 626, 630 to provide C2=R on outputs 256, 260. If both symbols C2=S (cycle sequence has been established), multiplexers 626, 630 provide C2=S.

In some embodiments, when the two respective rings have been aligned, synchronization errors are processed as follows. If cycle acquisition circuit 510 does not detect a cycle starting delimiter on input 222 on the 125 $\mu$s boundary (as is well known, in FDDI-II a new cycle is received every 125 $\mu$s), cycle acquisition circuit 510 signals cycle generation circuit 518 to generate a new cycle having the same programming template as the previous cycle. If LAB 514 does not have enough packet or isochronous data for a whole cycle, the empty packet positions in the new cycle are filled with symbol pairs LL, and the empty isochronous positions are filled with II. Cycle generation circuit 518 signals cycle sequence circuit 614 to signal the switch table circuit 622 to pass through one entire cycle.

If a cycle starting delimiter is not detected on input 248 near the 125 $\mu$s boundary, HMUX 218 repeats the cycles on output 226 and, upon detecting a starting delimiter on input 248, attempts to re-establish phase alignment.

According to the FDDI-II requirements, each HMUX 240, 218 (FIG. 2) provides a cycle on the respective output 248, 226 every 125 $\mu$s, that is, at the frequency of 8 KHz. Each multiplexer 240, 218 receives an 8 KHz reference to synchronize the cycle output. If hybrid multiplexers 240, 218 use different 8 KHz references, the two references may have slightly different frequencies. The frequency difference may eventually break the phase alignment established by HMUX 218 (FIG. 5). In some embodiments, to make breaking the phase alignment less frequent, the cycles on outputs 248, 226 are frequency aligned as illustrated in FIG. 7.

Figure 7:
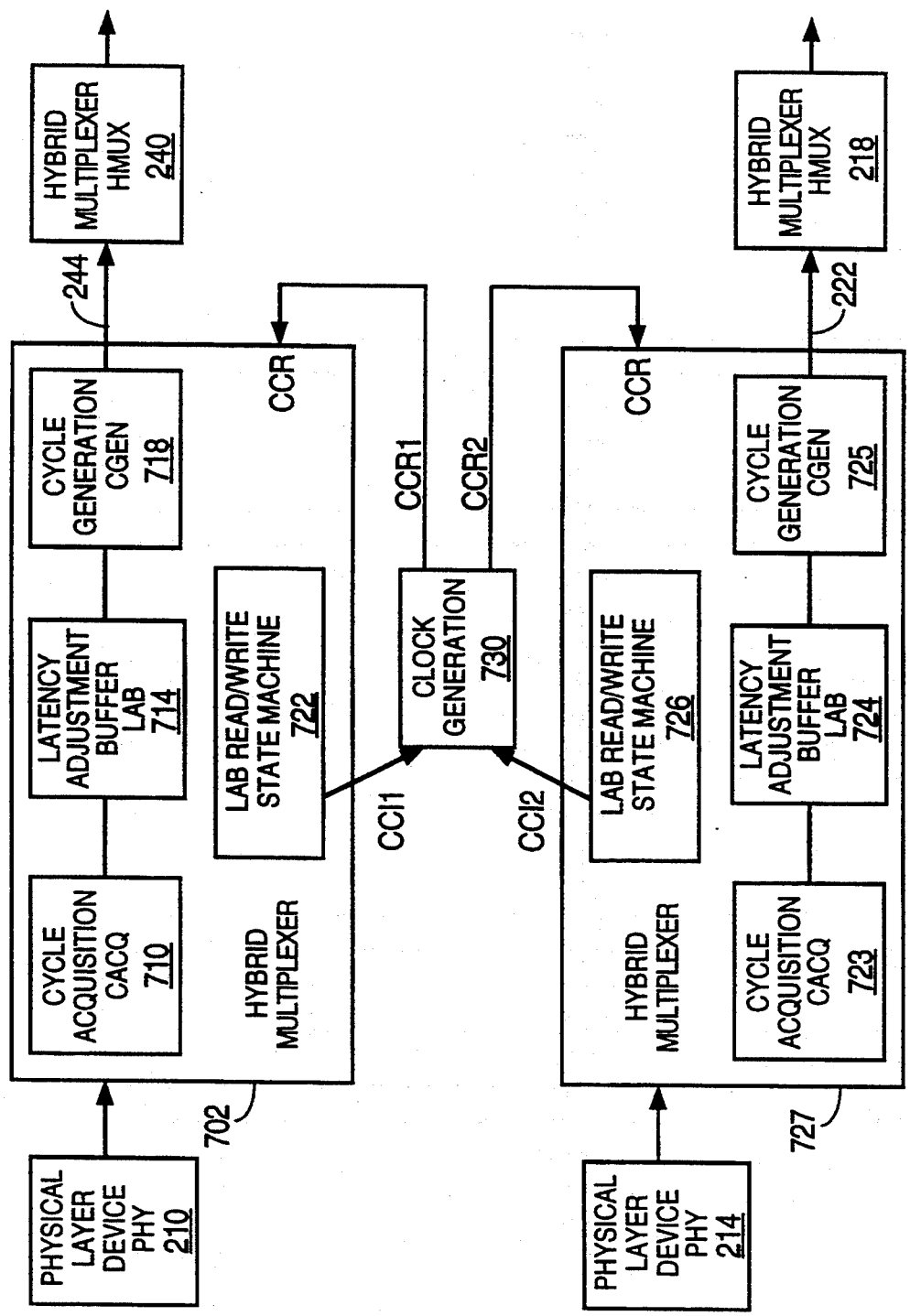
FIG. 7 is a block diagram illustrating frequency alignment of cycles produced by two hybrid multiplexers.

In FIG. 7, the output of PHY 210 is connected to input 244 of HMUX 240 through cycle acquisition circuit 710, LAB 714, and cycle generation circuit 718 which are parts of HMUX 702. LAB 714 is controlled by LAB read/write state machine 722.

Similarly, the output of PHY 214 is connected to input 222 of HMUX 218 through cycle acquisition circuit 723, LAB 724, and cycle generation circuit 725 which are parts of HMUX 727. LAB 724 is controlled by LAB read/write state machine 726.

LAB read/write state machine 722 generates an 8 KHz Cycle Clock Indicate ("CCI") reference CCI1 that synchronizes writing data into LAB 714. HMUX 702 has a Cycle Clock Request ("CCR") input for an 8 KHz reference that synchronizes reading data from LAB 714 and providing symbols on output 244. In particular, the CCR input synchronizes cycle generation circuit 718.

Similarly, LAB read/write state machine 726 generates an 8 KHz CCI reference CCI2 that synchronizes writing data into LAB 724. HMUX 727 has an input CCR for an 8 KHz reference to synchronize reading data from LAB 724 and providing symbols on output 222. In particular, the CCR input synchronizes cycle generation circuit 725.

In some embodiments, CCI references CCI1, CCI2 may have slightly different frequencies. However, the CCR references CCR1, CCR2 used by respective HMUXes 702, 727 have the same frequency except as described below. Hence signals on outputs 244, 222 are frequency aligned. Both HMUXes 240, 218 are synchronized by one and the same of the frequencies CCR1, CCR2, and hence signals on outputs 252, 226 are frequency aligned. Switch 230 is synchronized by the same CCR1 or CCR2 frequency used by HMUXes 240, 218.

References CCR1, CCR2 are generated by clock generating circuit 730 which selects one of the CCI references CCI1, CCI2 to determine the frequency of references CCR1, CCR2. Initially LABs 714, 724 are half full of data ("centered"), and circuit 730 selects arbitrarily one of references CCI1, CCI2 for both CCR1 and CCR2 references. In some embodiments, CCI1 is selected. In other embodiments, CCI2 is selected. HMUXes 702, 727 are not acting as the master on either ring 110P or ring 114P.1. The master stations on the respective rings make adjustments needed to maintain an integral number of cycles on each ring using methods known in the art.

Suppose that initially clock generating circuit 730 selects CCI1 for the two CCR frequencies. Suppose also that reference CCI1 is slower than reference CCI2. LAB 714 remains half full because the data are read out from LAB 714 and written into LAB 714 at the same frequency. By contrast, the amount of data in LAB 724 increases because the data are read out from LAB 724 slower than they are written in. When the amount of data in LAB 724 reaches a predetermined high threshold, an interrupt is generated to the station S1 microprocessor (not shown). The microprocessor then causes clock generating circuit 730 to select CCI2.

The amount of data in LAB 724 then stops changing. At the same time, the amount of data in LAB 714 decreases because the data are read out from LAB 714 faster than they are written in. When the amount of data in LAB 714 reaches a predetermined low threshold, an interrupt is generated to the station S1 microprocessor.

At this time, LAB 724 is at the high threshold, and LAB 714 is at the low threshold. A cycle slip is then generated. More particularly, HMUX 702 generates a fake cycle during which LAB 714 is filled by incoming data. Meanwhile, HMUX 727 repeats a cycle, and thus LAB 724 remains at the high threshold.

Clock generating circuit 730 then selects CCI2 for the CCR1 frequency. Hence, the amount of data in LAB 714 gradually decreases. CCR2 has generally the same frequency as CCR1. However, each time the amount of data in LAB 714 decreases by one symbol, circuit 730 shortens the current period of reference CCR2 by 40 ns. 40 ns is a time for one symbol output. Hence, the amount of data in LAB 724 also decreases by one symbol. Reference CCR2 is thus slightly faster than reference CCR1.

If LAB 724 becomes re-centered before LAB 714, circuit 730 causes CCR2 to have the same frequency as CCR1.

When LAB 714 becomes re-centered, circuit 730 repeats its operation from the initial stage. In particular, the CCR1 and CCR2 frequencies are set to the frequency of CCI1.

The frequency alignment is similar when circuit 730 initially selects CCI2, or when CCI1 is faster than CCI2.

Figure 8:
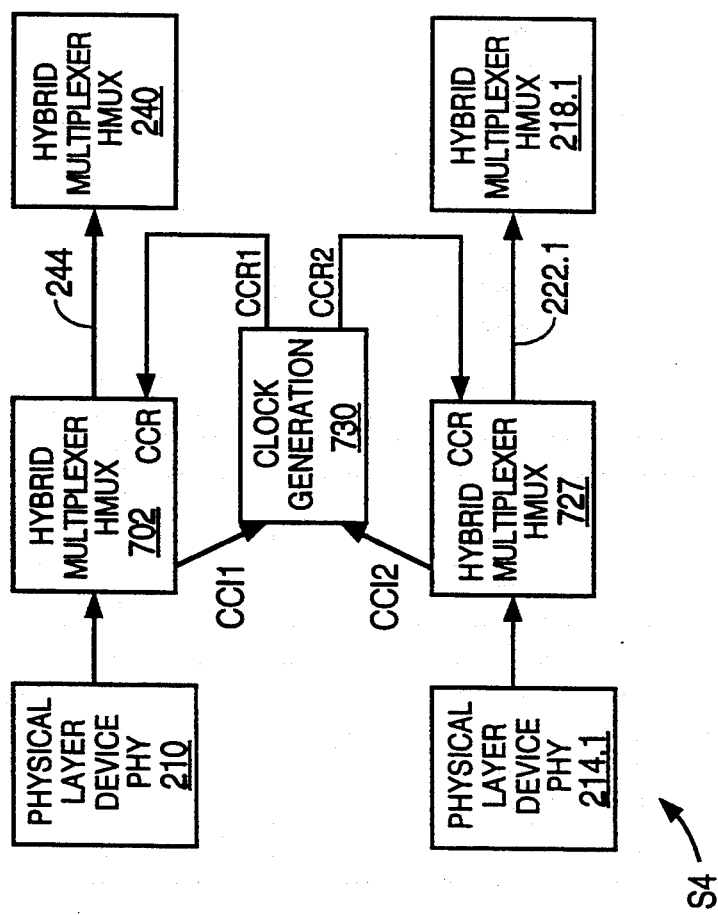
FIG. 8 is a block diagram illustrating frequency alignment in a concentrator.

As shown in FIG. 8, frequency alignment in concentrator station S4 is similar. HMUX 702 is connected between PHY 210 and input 244. HMUX 727 is connected between PHY 214.1 and input 222.1. Circuit 730 generates references CCR1, CCR2 for the two HMUXes.

While the invention has been illustrated with respect to the embodiments described above, these embodiments are not intended to limit the invention. For example, in some embodiments, each hybrid multiplexer output 248, 226, 252 carries one symbol rather than a symbol pair. In some embodiments, the data are exchanged between a primary ring and a secondary ring rather than between two primary or two secondary rings. In some embodiments, PMAC 264 and IMAC 268 (FIGS. 2, 3) are omitted, and output 256 is connected directly to a PHY, for example, to PHY 210. Thus in such embodiments the respective station S1-S3 is a repeater in the backbone ring. In some embodiments, PMAC 272 and IMAC 276 in FIGS. 2 or 3 and/or PMAC 272.1 and IMAC 276.1 in FIG. 3 and/or PMAC 272.2 and IMAC 276.2 in FIG. 3 are omitted. The respective station S1-S4 acts then as a repeater on respective ring 114P.1, 114P.2, 114P.3, 114.4, 115.5. Other embodiments and variations are within the scope of the invention, as defined by the following claims.

What is claimed is:

1. A method for transmitting data on first and second communication rings each of which uses the FDDI Hybrid Ring Control, HRC, protocol, said method comprising the steps of:
   providing a station for generating and repeating Hybrid Ring Control cycles in the first ring and the second ring;
   providing by said station HRC cycles with data from the first ring and HRC cycles with data from the second ring;
   aligning by said station the cycles with data from the first and second rings so that an HRC cycle starting delimiter of each cycle with data from the first ring and an HRC cycle starting delimiter of a respective cycle with data from the second ring are provided by said station simultaneously;
   for a plurality of HRC cycle symbol positions, providing a table defining for each position of said plurality whether the symbol at said position in an HRC cycle in the first ring is to be routed to the first ring, the second ring, or both the first and second rings, and whether the symbol at said position in the second ring is to be routed to the first ring, the second ring, or both the first and second rings;
   for a cycle C1 with data from the first ring and a cycle C2 with data from the second ring such that starting delimiters of cycles C1, C2 are provided by said station simultaneously, transmitting the cycles C1, C2 by said station so as to route the symbols at said positions in said cycles C1, C2 in accordance with said table and so that the symbols in the cycles C1, C2 in at least one of said positions are transmitted by said station before the entire cycles C1, C2 are provided by said station.

2. The method of claim 1 wherein said transmitting step comprises the step of routing the programming template of the cycle C1 to both the first and the second rings.

3. The method of claim 1 wherein said transmitting step comprises the steps of:
   transmitting by said station packet data of said cycle C1 on said second ring; and
   transmitting by said station packet data of said cycle C2 on said first ring.

4. The method of claim 1 wherein said transmitting step comprises the step of transmitting by said station at least one isochronous symbol of the cycle C1 on at least said first ring.

5. The method of claim 1 wherein said transmitting step comprises the steps of:
   transmitting by said station first isochronous data of the cycle C1 on said first ring while simultaneously transmitting first isochronous data of the cycle C2 on the second ring; and transmitting by said station second isochronous data of the cycle C1 on the second ring while simultaneously transmitting second isochronous data of the cycle C2 on the first ring.

6. The method of claim 1 wherein said transmitting step comprises the step of transmitting by said station isochronous data of said cycle C1 on both said first and second rings.

7. The method of claim 1 wherein said aligning step comprises the steps of:

monitoring the cycles, provided by said station, with data from the first ring to detect starting delimiters in the cycles with data from the first ring; and when a starting delimiter of the cycle C1 with data in said first ring is detected in said station, then providing by said station a starting delimiter of the cycle C2 with data from the second ring.

8. The method of claim 7 further comprising, when a starting delimiter of the cycle C1 is detected, the step of delaying the cycle C1 to phase align the cycles C1 and C2.

9. The method of claim 1 wherein said aligning step comprises the steps of:

providing in said station a latency adjustment buffer, LAB, LAB1 to buffer data from the first ring and a LAB LAB2 to buffer data from the second ring;

controlling the frequency of writing data into said buffer LAB1 by a cycle reference signal CLK1;

controlling the frequency of writing data into said buffer LAB2 by a cycle reference signal CLK2; and selecting the frequency of one of said signals CLK1, CLK2 to control the frequency of reading data from said buffers LAB1, LAB2.

10. The method of claim 9 wherein:

said signal CLK1 has a lower frequency than said signal CLK2;

said selecting step comprises the step of selecting the frequency of CLK1; and said method further comprises the steps of:

detecting when an amount of data in said buffer LAB2 rises to a predetermined high level; and upon said defecting, selecting the frequency of CLK2 to control the frequency of reading data from said buffers LAB1, LAB2.

11. The method of claim 9 wherein:

said signal CLK1 has a lower frequency than said signal CLK2;

said selecting step comprises the step of selecting the frequency of CLK2; and said method further comprises the steps of:

detecting when an amount of data in said buffer LAB1 falls below a predetermined level; and upon said detecting, selecting the frequency of CLK1 to control the frequency of reading data from said buffers LAB1, LAB2.

12. A method for frequency aligning signals provided by an FDDI-II hybrid multiplexer HMUX1 having a latency adjustment buffer LAB1 with signals provided by another FDDI-II hybrid multiplexer HMUX2 having a latency adjustment buffer LAB2, said method comprising the steps of:

controlling the frequency of writing data into said buffer LAB1 by a cycle reference signal CLK1;

controlling the frequency of writing data into said buffer LAB2 by a cycle reference signal CLK2; and selecting one of said signals CLK1, CLK2 to control the frequency of reading data from said buffers LAB1, LAB2.

13. The method of claim 12 wherein:

said signal CLK1 has a lower frequency than said signal CLK2;

said selecting step comprises the step of selecting the frequency of CLK1; and said method further comprises the steps of:

detecting when an amount of data in said buffer LAB2 rises to a predetermined high level; and upon said detecting, selecting the frequency of CLK2 to control the frequency of reading data from said buffers LAB1, LAB2.

14. The method of claim 12 wherein:

said signal CLK1 has a lower frequency than said signal CLK2;

said selecting step comprises the step of selecting the frequency of CLK2; and said method further comprises the steps of:

detecting when an amount of data in said buffer LAB1 falls below a predetermined level; and upon said detecting, selecting the frequency of CLK1 to control the frequency of reading data from said buffers LAB1, LAB2.

15. The method of claim 12 further comprising the steps of:

detecting when an amount of data in any one of the buffers LAB1, LAB2 rises to a predetermined high level or falls to a predetermined low level; and upon said detecting, selecting the frequency of the other one of the signals CLK1, CLK2 to control the frequency of reading data from said buffers LAB1, LAB2.

16. An FDDI-II hybrid multiplexer comprising:

a first input for receiving first Hybrid Ring Control, HRC, cycles;

a second input for receiving second HRC cycles;

an FDDI-II cycle generation circuit for repeating cycles received on said first input and providing third HRC cycles; and a decoder for detecting an HRC cycle starting delimiter on said second input and signaling to said cycle generation circuit a detection of such a starting delimiter to allow the cycle generation circuit to align the third cycles to the second cycles.

17. The hybrid multiplexer of claim 16 further comprising:

a first output for providing the third cycles;

a second output; and a delay circuit coupled between said second input and said second output for providing said second cycles on said second output with a delay.

18. The hybrid multiplexer of claim 17 wherein said cycle generation circuit starts a new cycle in response to said decoder signaling a detection of a starting delimiter so that cycles on said first and second outputs are phase aligned.

19. The hybrid multiplexer of claim 16 further comprising:

a cycle acquisition circuit coupled to said first input; and a latency adjustment buffer coupled between said cycle acquisition circuit and said cycle generation circuit.

20. An FDDI-II hybrid multiplexer comprising:
an input HIN1 for receiving first Hybrid Ring Control, HRC, cycles;
an input HIN2 for receiving second HRC cycles;
an output HOUT1;
FDDI-II cycle generation means for repeating said first cycles on said output HOUT1;
an output HOUT2;
means for providing said second cycles on said output HOUT2; and
means for phase aligning cycles appearing on said outputs HOUT1, HOUT2 as the cycles on the output HOUT1 are being provided by the cycle generation means and the cycles on the output HOUT2 are being provided by the providing means.

21. A communication station comprising a hybrid multiplexer of claim 20 and further comprising:
an input IN1 for receiving cycles on a first FDDI-II ring;
an output OUT1 for transmitting cycles on said first FDDI-II ring;
first physical layer means for receiving cycles on said input IN1 and for transmitting cycles on said output OUT1, said first physical layer means having an output PhysOut1 coupled to said input HIN1 of said hybrid multiplexer;
an input IN2 for receiving cycles on a second FDDI-II ring;
an output OUT2 for transmitting cycles on said second FDDI-II ring;
a second physical layer means for receiving cycles on said input IN2 and for transmitting cycles on said output OUT2, said second physical layer means having an output PhysOut2;
a hybrid multiplexer coupled between said output PhysOut2 and said input HIN2;
a switch having an output SwOut1 for providing an HRC cycle to said first ring and an output SwOut2 for providing an HRC cycle to said second ring, said switch being for selectively routing signals from said output HOUT1 to output SwOut1, output SwOut2, or both outputs SwOut1 and SwOut2, and for selectively routing signals from said output HOUT2 to output SwOut1, output SwOut2, or both outputs SwOut1 and SwOut2;
means for transmitting cycles from said output SwOut1 to said first physical layer means for transmission on said output Out1; and
means for transmitting cycles from said output SwOut2 to said second physical means for transmission on said output Out2.

22. A switch for routing FDDI-II Hybrid Ring Control, HRC, cycles on first and second FDDI-II rings, said switch comprising:
an input IN1 for receiving HRC cycles on said first ring;
an output OUT1 for providing HRC cycles on said first ring;
an input IN2 for receiving HRC cycles on said second ring;
an output OUT2 for providing HRC cycles on said second ring;
a first multiplexer for selecting one of said inputs IN1, IN2, said first multiplexer having an output coupled to said output OUT1;
a second multiplexer for selecting one of said inputs IN1, IN2, said second multiplexer having an output coupled to said output OUT2;
a first decoder for detecting an HRC starting delimiter on said input IN1;
a second decoder for detecting an HRC starting delimiter on said input IN2;
a cycle sequence circuit coupled to said first and second decoders such that when said first and second decoders detect starting delimiters on respective inputs IN1, IN2 simultaneously, said cycle sequence circuit provides a signal S1 identifying at any given time a cycle position of symbols appearing on said inputs IN1, IN2; and
a switch table circuit for storing a table which defines for a plurality of HRC cycle symbol positions whether for each position of said plurality, the symbol at said position in an HRC cycle on said input IN1 is to be routed to output OUT1, output OUT2, or both outputs OUT1 and OUT2 and whether the symbol at said position in an HRC cycle on said input IN2 is to be routed to output OUT1, output OUT2, or both outputs OUT1 and OUT2, said switch table circuit being responsive to said signal S1 for causing said first and second multiplexers to route HRC cycles on said inputs IN1, IN2 in accordance with said table.

23. An apparatus for providing frequency-aligned Hybrid Ring Control, HRC, cycles on first and second FDDI-II rings, said apparatus comprising:
a hybrid multiplexer HMUX1 comprising:
a latency adjustment buffer LAB1;
means for generating a cycle reference signal CLK1 to control the rate of writing data into said buffer LAB1; and
an input IN1 for receiving a cycle reference signal to control the rate of reading data from said buffer LAB1;
a hybrid multiplexer HMUX2 comprising:
a latency adjustment buffer LAB2;
means for generating a cycle reference signal CLK2 to control the rate of writing data into said latency adjustment buffer LAB2; and
an input IN2 for receiving a cycle reference signal to control the rate of reading data from said buffer LAB2; and
a clock generating circuit for selecting one of said signals CLK1, CLK2 and providing to said inputs IN1, IN2 signals whose frequencies are determined by the frequency of the selected one of said signals CLK1, CLK2.

24. The apparatus of claim 23 wherein said clock generating circuit comprises means for making one of said signals provided to said inputs IN1, IN2 to have a greater frequency than the other one of said signals provided to said inputs IN1, IN2.

25. The apparatus of claim 23 further comprising means for detecting when an amount of data in any one of the buffers LAB1, LAB2 rises to a predetermined high level or falls to a predetermined low level and, upon said detecting, for causing the clock generating circuit to select the other one of the signals CLK1, CLK2 to determine the frequencies of the signals provided to the inputs IN1, IN2.

26. A method for frequency aligning signals provided by a first network with signals provided by a second network, the first and second networks being for transmission of cycles of information, each cycle comprising a plurality of channels each of which can be allocated for connection between communication stations, wherein the first network comprises a latency adjustment buffer LAB1 for writing data of the first network thereto and reading data of the first network therefrom, and the second network comprises a latency adjustment buffer LAB2 for writing data of the second network thereto and reading data of the second network therefrom, the method comprising the steps of:

controlling the frequency of writing data into the buffer LAB1 by a cycle reference signal CLK1;

controlling the frequency of writing data into the buffer LAB2 by a cycle reference signal CLK2;

selecting one of the signals CLK1, CLK2 to control the frequency of reading data from the buffers LAB1, LAB2;

detecting when an amount of data in one of the buffers LAB1, LAB2 rises to a predetermined high level or falls to a predetermined low level; and upon said detecting, selecting the frequency of the other one of the signals CLK1, CLK2 to control the frequency of reading data from the buffers LAB1, LAB2 to reduce the frequency of cycle slips in the first and second networks.

27. An apparatus for frequency aligning signals provided by a first network with signals provided by a second network, the first and second networks being for transmission of cycles of information, each cycle comprising a plurality of channels each of which can be allocated for connection between communication stations, the apparatus comprising:

a latency adjustment buffer LAB1 for the first network;

means for generating a cycle reference signal CLK1 to control the rate of writing data into the buffer LAB1;

an input IN1 for receiving a cycle reference signal to control the rate of reading data from the buffer LAB1;

a latency adjustment buffer LAB2;

means for generating a cycle reference signal CLK2 to control the rate of writing data into the buffer LAB2;

an input IN2 for receiving a cycle reference signal to control the rate of reading data from the buffer LAB2; and means for selecting one of the signals CLK1, CLK2 to determine the frequency of signals provided to the inputs IN1, IN2, wherein when the selecting means selects one of the signals CLK1, CLK2 and then an amount of data in one of the buffers LAB1, LAB2 rises to a predetermined high level or falls to a predetermined low level, the selecting means selects the other one of the signals CLK1, CLK2 so as to reduce the frequency of cycle slips on the first and second networks.

* * * * *

UNITED STATES PATENT AND TRADEMARK OFFICE
CERTIFICATE OF CORRECTION

PATENT NO. : 5,440,557
DATED : August 8, 1995
INVENTOR(S) : David C. Brief

It is certified that error appears in the above-identified patent and that said Letters Patent is hereby corrected as shown below:

Column 2, line 52
    delete "NS" and insert -- N8 --

Column 10, line 22
    after "Each" insert -- hybrid --

Signed and Sealed this

Sixteenth Day of January, 1996

Attest:

BRUCE LEHMAN

Attesting Officer    Commissioner of Patents and Trademarks